Jan. 5, 1971
A. H. SHOEMAKER
3,552,830
THREE MEMBER MICROSCOPE OBJECTIVE HAVING
A MAGNIFICATION OF 20X
Filed Dec. 9, 1968
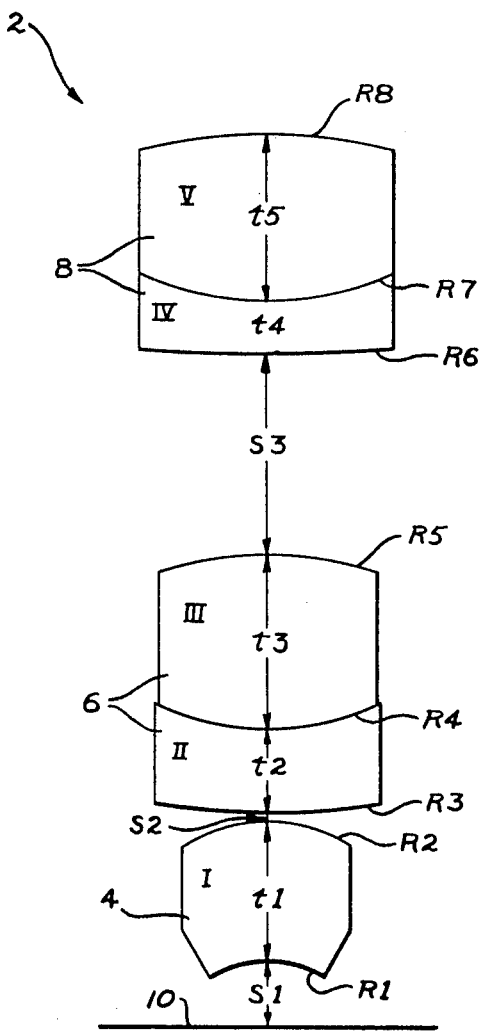
INVENTOR.
ARTHUR H. SHOEMAKER
BY
*Robert J. Bird*
ATTORNEY

United States Patent Office 3,552,830
Patented Jan. 5, 1971

3,552,830
THREE MEMBER MICROSCOPE OBJECTIVE HAVING A MAGNIFICATION OF 20×
Arthur H. Shoemaker, East Aurora, N.Y., assignor to American Optical Corporation, Southbridge, Mass., a corporation of Delaware
Filed Dec. 9, 1968, Ser. No. 782,066
Int. Cl. G02b 9/12, 21/02
U.S. Cl. 350—176     2 Claims

ABSTRACT OF THE DISCLOSURE

A three member microscope objective having a numerical aperture of substantially 0.50 and a magnification of substantially 20×.

BACKGROUND OF THE INVENTION

The present invention relates to a microscope objective.

An object of the present invention is to provide an achromatic microscope objective having a numerical aperture of substantially 0.50 and a magnification of substantially 20×, in which chromatic and spherical aberrations, coma, and astigmatism are well corrected while yet providing a substantially flat image field, when used with a telescope objective as described in U.S. Pat. No. 3,355,234.

DRAWING

In the drawing, a microscope objective is represented by a plurality of lenses viewed transversely to their axis.

Description

Referring now to the drawing, a microscope objective is generally shown at 2. It includes a front single lens 4, a doublet 6, and a doublet 8, all of said lenses being in axial alignment. Objective 2 is disposed relative to an object plane as shown in the drawing.

Lens 4, also designated I, is a single concavo-convex lens. Doublet 6 includes a convex-concavo lens II and a double convex lens III, together forming a double convex doublet. Doublet 8 includes a convex-concavo lens IV and a double convex lens V, together forming a double convex doublet.

The lens parameters are as follows: The successive lens radii are designated R1–R8, where a minus sign indicates radii on centers of curvature lying on the object side of their vertices. The axial thicknesses of successive lens elements are designated $t_1$–$t_5$. The successive axial spaces from the object plane 14 are designated S1–S3. The refractive indices of the successive lens elements are designated ND1–ND5. The Abbe numbers of the successive lens glasses are designated $\gamma_1$–$\gamma_5$ respectively.

The above-mentioned parameters are related to the focal length according to the following constructional data:

[Magnification=20×; N.A.=0.50]

| Lens | Radius, R | Thickness, t | Space, S | Refractive Index, ND | Abbe Number, γ |
|---|---|---|---|---|---|
| I | R1=−.4306F | | S1=.1849F | | |
| | | t1=.5346F | | ND1=1.78833 | γ1=50.47 |
| | R2=−.6060F | | | | |
| | | | S2=.0285F | | |
| | R3=2.8566F | | | | |
| II | | t2=.3216F | | ND2=1.80489 | γ2=25.45 |
| | R4=1.0188F | | | | |
| III | | t3=.6530F | | ND3=1.69669 | γ3=55.60 |
| | R5=−1.3928F | | | | |
| | | | S3=.7479F | | |
| | R6=26.2749F | | | | |
| IV | | t4=.1994F | | ND4=1.80785 | γ4=40.72 |
| | R7=1.2375F | | | | |
| V | | t5=.6212F | | ND5=1.50371 | γ5=66.72 |
| | R8=−2.0117F | | | | |

The foregoing parameters of radius, thickness and space are based on the value of F. The value of F in this case, as an example, is 9.1385. Given in numbers, the foregoing data is as follows:

[F=9.1385; Magnification=20×; N.A.=0.50]

| Lens | Radius, R | Thickness, t | Space, S | Refractive Index, ND | Abbe Number, γ |
|---|---|---|---|---|---|
| I | R1=−3.935 | | S1=1.690 | | |
| | | t1=4.885 | | ND1=1.78833 | γ1=50.47 |
| | R2=−5.538 | | | | |
| | | | S2=.260 | | |
| | R3=26.105 | | | | |
| II | | t2=2.939 | | ND2=1.80489 | γ2=25.45 |
| | R4=9.310 | | | | |
| III | | t3=5.967 | | ND3=1.69669 | γ3=55.60 |
| | R5=−12.728 | | | | |
| | | | S3=6.835 | | |
| | R6=240.113 | | | | |
| IV | | t4=1.822 | | ND4=1.80785 | γ4=40.72 |
| | R7=11.309 | | | | |
| V | | t5=5.677 | | ND5=1.50271 | γ5=66.72 |
| | R8=−18.384 | | | | |

It will be apparent that the foregoing absolute values are variable depending on the value of F. Other forms are thus possible and changes may be made in the values of the constructional data based on the relationships in the first of the above charts, without departing from the spirit of this invention.

What is claimed is:

1. An achromatic microscope objective having a magnification of substantially 20× and a numerical aperture of substantially 0.50 for forming an image of an object plane, said image being well corrected for spherical and chromatic aberrations, coma, astigmatism and curvature of image field, said objective comprising:

a front concavo-convex singlet lens member I;
a second convex-concavo lens member II;
a third double convex lens member III;
said second and third members forming a doublet;
a fourth convex-concavo lens member IV;
a fifth double convex lens member V;
said fourth and fifth members forming a doublet;
all of said lens members being axially aligned; and
the parameters of lens radii (R1–R8), lens thicknesses ($t1$–$t5$), axial spaces among lens elements and object plane (S1–S3), refractive indices (ND1–ND5), and Abbe numbers ($\gamma 1$–$\gamma 5$), being determined by the following relationship:

| Lens | Radius, R | Thickness, t | Space, S | Refractive Index, ND | Abbe Number, $\gamma$ |
|---|---|---|---|---|---|
| I | R1=−.4306F | T1=.5346F | S1=.1849F | ND1=1.78833 | $\gamma 1$=50.47 |
|   | R2=−.6060F |          | S2=.0285F |             |                  |
|   | R3=2.8566F |          |           |             |                  |
| II | R4=1.0188F | t2=.3216F |          | ND2=1.80489 | $\gamma 2$=25.45 |
| III |           | t3=.6530F |          | ND3=1.69669 | $\gamma 3$=55.60 |
|   | R5=−1.3928F |         | S3=.7479F |             |                  |
|   | R6=26.2749F |         |           |             |                  |
| IV | R7=1.2375F | t4=.1994F |          | ND4=1.80785 | $\gamma 4$=40.72 |
| V  | R8=−2.0117F | t5=.6212F |         | ND5=1.50371 | $\gamma 5$=66.72 | wherein scalar values are given in millimeters.

2. An achromatic microscope objective having a magnification of substantially 20× and a numerical aperture of substantially 0.50 for forming an image of an object plane, said image being well corrected for spherical and chromatic aberrations, coma, astigmatism and curvature of image field, said objective comprising:

a front concavo-convex lens member I;
a second convex-concavo lens member II;
a third double convex lens member III;
said second and third members forming a doublet;
a fourth convex-concavo lens member IV;
a fifth double convex lens member V;
said fourth and fifth members forming a doublet;
all of said lens members being axially aligned; and
the parameters of lens radii (R1–R8), lens thicknesses ($t1$–$t5$), axial spaces among lens elements and object plane (S1–S3), refractive indices (ND1–ND5), and Abbe numbers ($\gamma 1$–$\gamma 5$), as follows:

| Lens | Radius, R | Thickness, t | Space, S | Refractive Index, ND | Abbe Number, $\gamma$ |
|---|---|---|---|---|---|
| I | R1=−3.935 | t1=4.885 | S1=1.690 | ND1=1.78833 | $\gamma 1$=50.47 |
|   | R2=−5.538 |          | S2=.260  |             |                  |
|   | R3=26.105 |          |          |             |                  |
| II | R4=9.310 | t2=2.939 |          | ND2=1.80489 | $\gamma 2$=25.45 |
| III |         | t3=5.967 |          | ND3=1.69669 | $\gamma 3$=55.60 |
|   | R5=−12.728 |        | S3=6.835 |             |                  |
|   | R6=240.113 |        |          |             |                  |
| IV | R7=11.309 | t4=1.822 |         | ND4=1.80785 | $\gamma 4$=40.72 |
| V  | R8=−18.384 | t5=5.677 |        | ND5=1.50271 | $\gamma 5$=66.72 | wherein scalar values are given in millimeters.

References Cited

UNITED STATES PATENTS 3,437,398   4/1969   Muller et al. _____ 350—225X

JOHN K. CORBIN, Primary Examiner

U.S. Cl. X.R.

350—225